No. 890,385. PATENTED JUNE 9, 1908.
W. THURMAN.
FEED CUTTER.
APPLICATION FILED JAN. 13, 1908.

2 SHEETS—SHEET 1.

Witnesses:
Ralph Nelson
George Felber

Inventor:
William Thurman
By Oliphant & Young
Attorneys

No. 890,385.

PATENTED JUNE 9, 1908.

W. THURMAN.
FEED CUTTER.
APPLICATION FILED JAN. 13, 1908.

2 SHEETS—SHEET 2.

Witnesses:
Ralph J. Nelson
George Telber

Inventor:
William Thurman
By Oliphant & Young
Attorneys.

THE NORRIS PETERS CO., WASHINGTON, D. C.

UNITED STATES PATENT OFFICE.

WILLIAM THURMAN, OF PLYMOUTH, WISCONSIN.

FEED-CUTTER.

No. 890,385.　　　Specification of Letters Patent.　　　Patented June 9, 1908.

Application filed January 13, 1908. Serial No. 410,558.

*To all whom it may concern:*

Be it known that I, WILLIAM THURMAN, a citizen of the United States, and resident of Plymouth, in the county of Sheboygan and State of Wisconsin, have invented certain new and useful Improvements in Feed-Cutters; and I do hereby declare that the following is a full, clear, and exact description thereof.

The object of my invention is to provide simple, effective, and positive feed-mechanism for that class of cutters wherein double sets of feed-rollers are employed, the construction and arrangement of the parts being such that the upper feed-rollers are held in their proper relative position, said construction at the same time permitting the rollers to rise or wabble freely independent of each other and without liability of cramping their respective driving gears.

The invention consists in various details of construction and combination of parts as hereinafter fully described with reference to the accompanying drawings and subsequently claimed.

Figure 1:
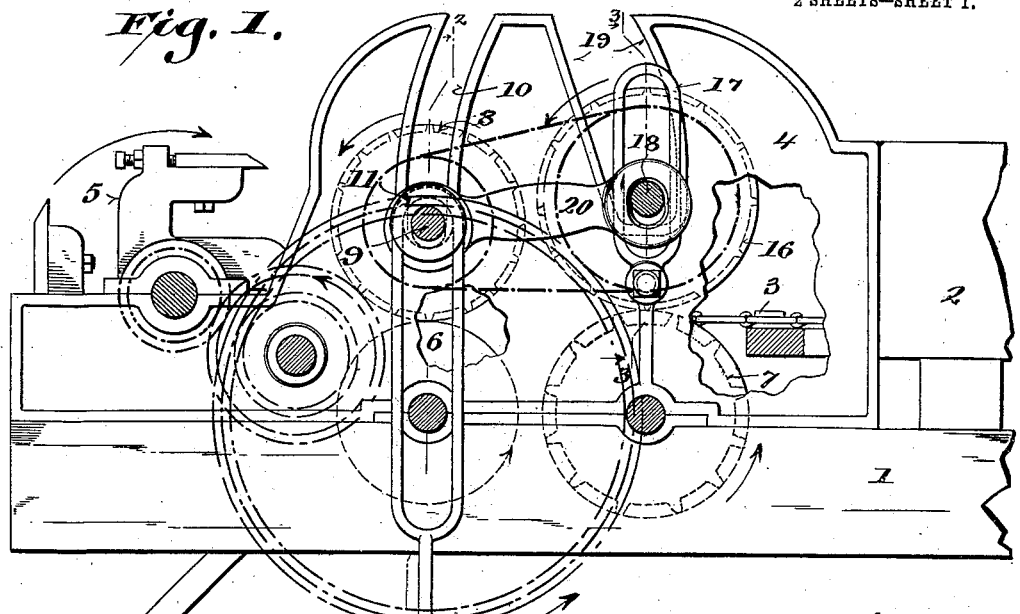
Figure 3:
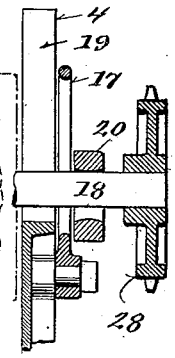
Figure 2:
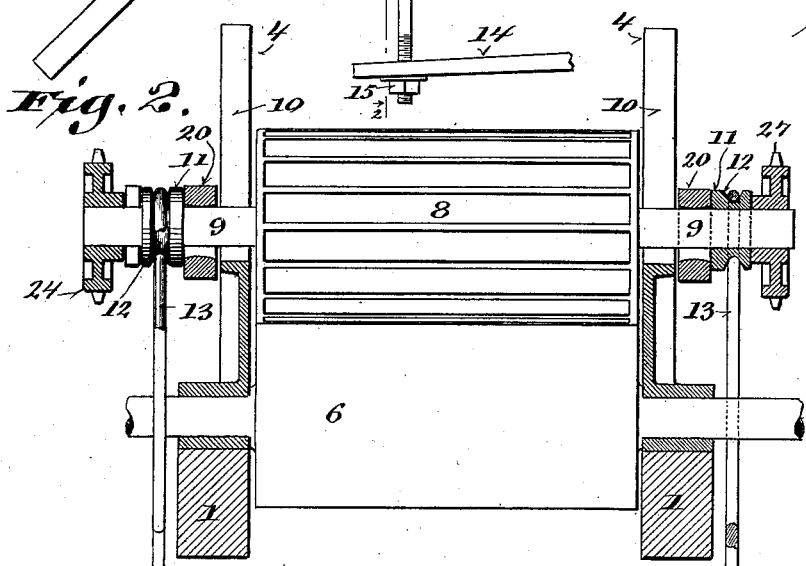
Figure 4:
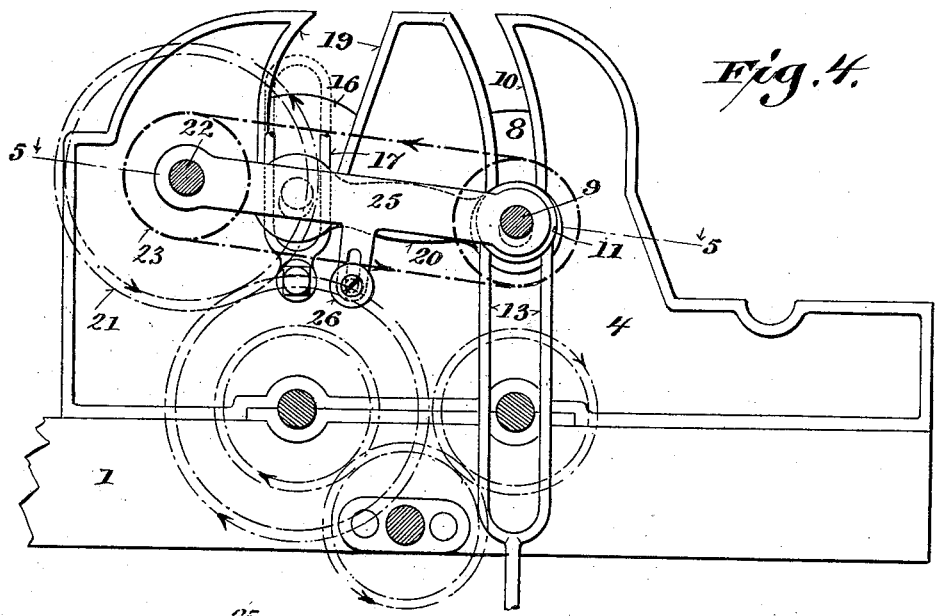

In the drawings: Figure 1 represents a side elevation of a portion of a feed-cutter embodying the features of my invention, the several shafts being in section and the driving-gears indicated by dotted lines; Fig. 2, a cross-section of the same, as indicated by line 2—2 of Fig. 1; Fig. 3, a detail cross-section on line 3—3 of Fig. 1; Fig. 4, a side elevation similar to Fig. 1, but looking from the reverse side of the machine, the cutter-head being removed and Fig. 5, a detail plan sectional view of the same, as indicated by line 5—5 of Fig. 4.

Referring by numerals to the drawings, 1 indicates the side-sills of a frame for the support of a feed-trough 2, over the bottom of which trough is arranged to travel an endless lag-chain 3 constituting an apron. Abutting the trough-ends and secured to the sills are a pair of side-plates 4 constituting a housing and provided with bearings for the shafts of a rotary cutter-head 5 and the trunnions of fixed lower feed and auxiliary rollers 6, 7, respectively. The lower auxiliary feed-roller 7 in addition to receiving the material from the trough, also serves as a driver for the lag-chain, which chain is mounted upon the same, the feed-roller 6 being preferably smaller in diameter than the former and is located adjacent to the cutter-head.

Mounted directly over the feed-roller 6 is an upper feed-roller 8 having trunnions 9 which extend through sector-slots 10 in the side-plates. The trunnions of this roller have loosely fitted thereon collars 11, which collars are provided with annular grooves 12 for the reception of the upper looped ends of a pair of stirrups 13. The stirrups terminate with depending rod-portions which are secured to the ends of spring-bars 14, by means of nuts 15 in threaded engagement with the rod-ends. The ends of the spring-bars (not shown) are secured to the feed-cutter frame in the usual manner, said spring-bars and their connections serving to exert tension upon the upper feed-roller in opposition to the lower roller.

From the above described mechanism it is apparent that the upper feed-roller is free to rise and fall or wabble under spring-tension, the collars 11 serving as bearings for the trunnions will rock at any angle assumed by the rollers without becoming disengaged from the looped ends of the stirrups, which ends are securely nested in the collar grooves.

An upper auxiliary floating feed-roller 16 is mounted over the lower auxiliary roller 7 having trunnions 18 projecting through slots 19 of the side-plates. The trunnions of this auxiliary feed-roller have their bearings in eyes of links 20, the opposite ends of which links have similar eyes engaging the trunnions of the upper feed-roller 8, the eyes at each end of the links being elongated and formed with slightly convexed bearing faces for the trunnions in order to permit the same to rock or assume various angles without liability of binding. The links just described serve as keepers for both the upper and auxiliary feed-rollers, the latter being capable of a floating motion at the free ends of said links independent of the spring-tension exerted upon the upper feed-roller proper. The upper auxiliary roller is preferably larger in diameter than the feed-roller 8 so as to more readily ride over and engage the loose straw or material being fed thereunder. The weight of this auxiliary roller is sufficient to exert a feeding-grip on the material, thereby causing the same to be delivered between the feed-rollers 6 and 8, which rollers, owing to the spring-tension device, compress said material into a compact flat mass preparatory to being cut. Should the mass of material be distributed unevenly under the auxiliary and upper feed-rollers the same are free to assume relative angular positions in keeping with said material.

To prevent the trunnions of the upper auxiliary feed-roller 16 from rising out of the side-plate slots and its consequent damage, retaining loop-straps 17 are provided, which straps are fitted over said trunnions, the same being pivoted to the side-plates 4 to permit oscillation, caused by the arc-movement described by the aforesaid trunnions when said auxiliary roller 16 rises independently of the feed-roller proper.

Power is transmitted from the shaft of the lower feed-roller 6 to the cutter-head 5 by a gear-train as indicated by dotted lines of Fig. 1 of the drawings, the method of gearing forming no part of my invention. The upper feed-roller 8 and lower auxiliary roller 7 are also driven from the shaft of the lower feed-roller 6, through a gear-train indicated by dotted lines in Fig. 4. This gear-train imparts motion to an idle toothed gear-wheel 21, which gear-wheel is mounted upon a stud 22 projecting from one of the side-plates 4, the stud being located upon the axis of the sector slot 10. The gear-wheel 21 carries a sprocket-wheel 23, which is in link-belt connection with a similar sprocket-wheel 24 fast on the trunnion 9 of the upper feed-roller 8, by means of which said feed-roller is positively driven.

In order to prevent breakage or slackening of the link-belt which connects the sprocket-wheels, caused through rise of either feed-roller 8 or 16, a spacing link 25 is provided. This link is loosely fitted over the stud 22 and the trunnion of roller 8, thus serving to maintain the fixed distance between the sprocket-wheels regardless of any motion of the upper feed-rollers, the link being also provided with a chain-tightening pulley 26, as shown in Figs. 4 and 5 of the drawings.

Figure 5:
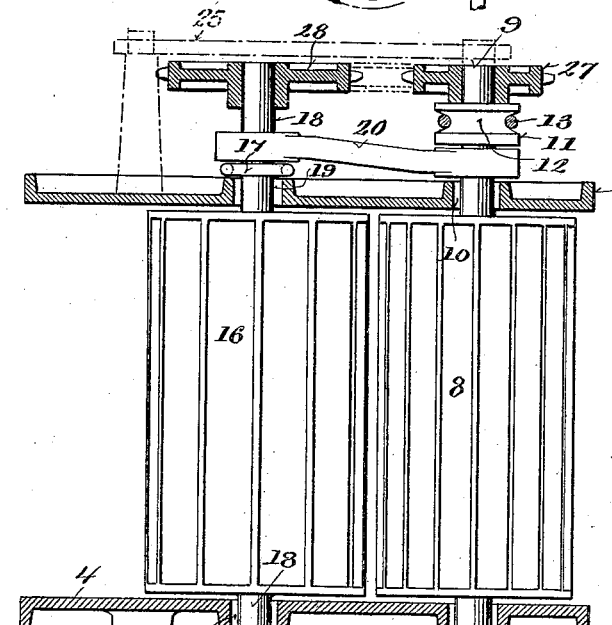

While I have shown the spacing-link 25 as being applied to only one side of the machine, it is evident that in some instances, if desired, a similar link may be provided at the opposite side of the machine as indicated by dotted lines in Fig. 5, in which case a stud similar to that previously described would extend from the side-plate for the reception of said link.

The upper auxiliary roller is driven from the trunnion 9 of the upper feed-roller by a sprocket-wheel 27 fast thereon and in link-belt connection with a sprocket-wheel 28 secured to the trunnion 18 of said upper auxiliary roller, the driving-gears of all the rollers being of such proportion that the peripheral speed of said roller is approximately the same.

From the foregoing description it is apparent that by the link-connections between the upper feed and upper auxiliary rollers, the same are capable of independent rise and fall or wabble without cramping or otherwise interfering with the smooth and easy running of the parts, the construction also insuring uniform feeding of straw or other material to the cutter-head, regardless of its bulk, particular attention being called to the fact that the upper auxiliary roller is not under spring-tension, but depends upon gravity for the initial feed and thereby materially lessens the liability of accident caused through an operator inadvertently placing his hands in position to be caught between the auxiliary rollers.

I claim:

1. In a feed-cutter, a slotted housing, fixed feed and auxiliary rollers mounted in the housing, and upper feed and auxiliary rollers having trunnions extending through slots provided in the housing; the combination of links having eyes fitted over the upper feed and auxiliary roller trunnions, grooved collars loosely mounted upon the upper feed-roller trunnions, stirrups fitted in the collar-grooves, and a yielding tension device secured to the stirrups, whereby pressure is exerted upon said upper feed-roller independent of the auxiliary feed-roller.

2. In a feed-cutter, a slotted housing, fixed feed and auxiliary rollers mounted in the housing, and upper feed and auxiliary rollers having trunnions extending through slots provided in the housing; the combination of links having vertically elongated eyes fitted over the upper feed and auxiliary roller trunnions, retaining-straps in pivotal-connection with the housing, the straps being provided with looped ends fitted over the trunnions of the upper auxiliary roller, grooved collars loosely mounted upon the upper feed-roller trunnions, stirrups fitted in the collar-grooves, and a yielding tension device, whereby pressure is exerted upon said upper feed-roller independent of the auxiliary feed-roller.

3. In a feed-cutter, provided with a slotted housing, fixed feed and auxiliary rollers mounted in the housing, upper feed and auxiliary rollers having trunnions extending through the housing slots, the combination of links having eyes fitted over the trunnions, of the upper feed and auxiliary rollers, collars carried by the upper feed roller trunnions, spring bars carried by the feed-cutter, stirrups connecting the spring-bars and collars, driving means for the upper auxiliary roller in connection with the upper feed-roller, a stud carried by said housing, a spacing-link connecting the stud and trunnion of said upper feed-roller, and a driven gear-wheel mounted upon said stud in gear-connection with the aforesaid upper feed-roller.

In testimony that I claim the foregoing I have hereunto set my hand at Plymouth, in the county of Sheboygan and State of Wisconsin, in the presence of two witnesses.

WILLIAM THURMAN.

Witnesses:
H. W. HOSTMAN,
W. L. KAESTNER.